(12) United States Patent
Hayashi

(10) Patent No.: US 6,859,319 B2
(45) Date of Patent: Feb. 22, 2005

(54) OPTICAL ELEMENT, MOLD FOR MOLDING OPTICAL ELEMENT AND OPTICAL PICKUP DEVICE

(75) Inventor: Kenichi Hayashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/409,692

(22) Filed: Apr. 8, 2003

(65) Prior Publication Data

US 2004/0008415 A1 Jan. 15, 2004

(30) Foreign Application Priority Data

Apr. 9, 2002 (JP) ........................... 2002-106024
Apr. 9, 2002 (JP) ........................... 2002-106025

(51) Int. Cl.⁷ ............................... G02B 5/18
(52) U.S. Cl. ..................... 359/571; 369/112.03
(58) Field of Search ....................... 359/571, 566, 359/569; 369/112.03, 112.05, 112.06, 112.07, 112.12

(56) References Cited

U.S. PATENT DOCUMENTS 5,073,007 A * 12/1991 Kedmi et al. ............... 359/565
5,638,212 A *  6/1997 Meyers et al. ............. 359/569
6,687,037 B2 *  2/2004 Hendriks et al. .......... 359/205

FOREIGN PATENT DOCUMENTS

JP    2001-143312    5/2001
JP    2001-256670    9/2001

* cited by examiner

*Primary Examiner*—Thong Nguyen
*Assistant Examiner*—Arnel C. Lavarias
(74) *Attorney, Agent, or Firm*—Hogan & Hartson, L.L.P.

(57) ABSTRACT

An optical element including a binary blaze grating formed thereon, wherein the binary blaze grating is formed so as to have step differences formed by a number of levels produced by mechanical processing. The number of levels is equal to or more than 5 and the height of the step difference is greater than or equal to 1 μm.

13 Claims, 5 Drawing Sheets

OPTICAL ELEMENT, MOLD FOR MOLDING OPTICAL ELEMENT AND OPTICAL PICKUP DEVICE

BACKGROUND OF THE INVENTION

1. Field of the Invention

The present invention relates to an optical element having a binary blaze grating which is suitable to be used as an optical axis adjusting element for adjusting an optical axis of a light beam in such a manner that light beams with different wavelengths are received by a common photo detector in a two-wavelength light source type optical pickup device. The present invention also relates to a mold for molding the optical element and an optical element formed by the mold. Furthermore, the present invention also relates to an optical pickup device in which the optical element is assembled as an optical axis adjusting element.

2. Description of Related Art

A two-wavelength type optical pickup device is known as an optical pickup device for recording to or reproducing from a DVD or a CD, which is provided with a laser light source with a wavelength of 650 nm for DVD and a laser light source with a wavelength of 780 nm for CD. In recent years, a monolithic type twin-laser light source, in which two laser diodes are formed on a semiconductor substrate contained in a single package, or the like, has been used to make the two-wavelength light source smaller and compact.

In the case of the twin-laser light source, the light emitting points of both laser diodes which are disposed in parallel are positioned apart with a distance of about 100 μm. Accordingly, when one of the optical axes of the laser diodes is aligned with a system optical axis, the optical axis of the laser beam from the other laser diode is shifted from the system optical axis. In this situation, the respective return light beams, which are emitted from both laser diodes and reflected by an optical recording medium, cannot be received with a common photo detector. Therefore, one of the return light beams is diffracted by using an optical axis adjusting element such as a diffraction grating or a diffraction grating referred to as a light path-composing element for enabling both return light beams to be received by the common photo detector.

A two-light source type optical pickup device provided with such an optical axis adjusting element or a light path-composing element is known.

Moreover, in an optical pickup device, a diffraction grating is used in order to divide an emitted laser beam into three beams for producing a tracking error signal of an objective lens. Such an optical axis adjusting element or a light path-composing element is also used in conventional optical pickup devices.

It is conceivable that a diffraction grating of a binary blaze shape (binary optics) is used as an optical axis adjust element of an optical pickup device. The diffraction grating has a structure, i.e., formed in such a manner that its blaze grating face is formed on the light incident surface of the optical element in a stepped shape or is formed on the light emitting surface of the optical element in a stepped shape.

An optical element provided with a binary blaze grating is generally made of an inorganic material such as glass, and the number of levels is usually act to be $2^a$ ("a" is a positive integer), that is, 2 to the power of "a", such as 2, 4 or 8 levels. An "x" level ("x" is a positive integer) means a binary blaze structure having step differences of the number of (x−1). The number of levels of even numbers is determined considering the work efficiency when a face of the binary blaze grating is produced in the optical element.

In general, the step shape of a grating form face is formed by an etching process. Thus, the number of times of etching required to the number of levels is two for 3 levels or 4 levels, three for 5, 6, 7 or 8 levels as described below. In the case other than the number of levels of $2^a$, for example, in the case of the number of levels such as 3, 5, 6, 7, 9 and 10, the number of times of etching tends to increase in comparison with that of $2^a$ levels. Moreover, the resist film with a complicated configuration is required, which results in the reduction of work efficiency.

| Number of levels | Number of times of etching |
|---|---|
| 2 | once |
| 3 | twice |
| 4 | twice |
| 5 | three times |
| 6 | three times |
| 7 | three times |
| 8 | three times |

Figure 6:
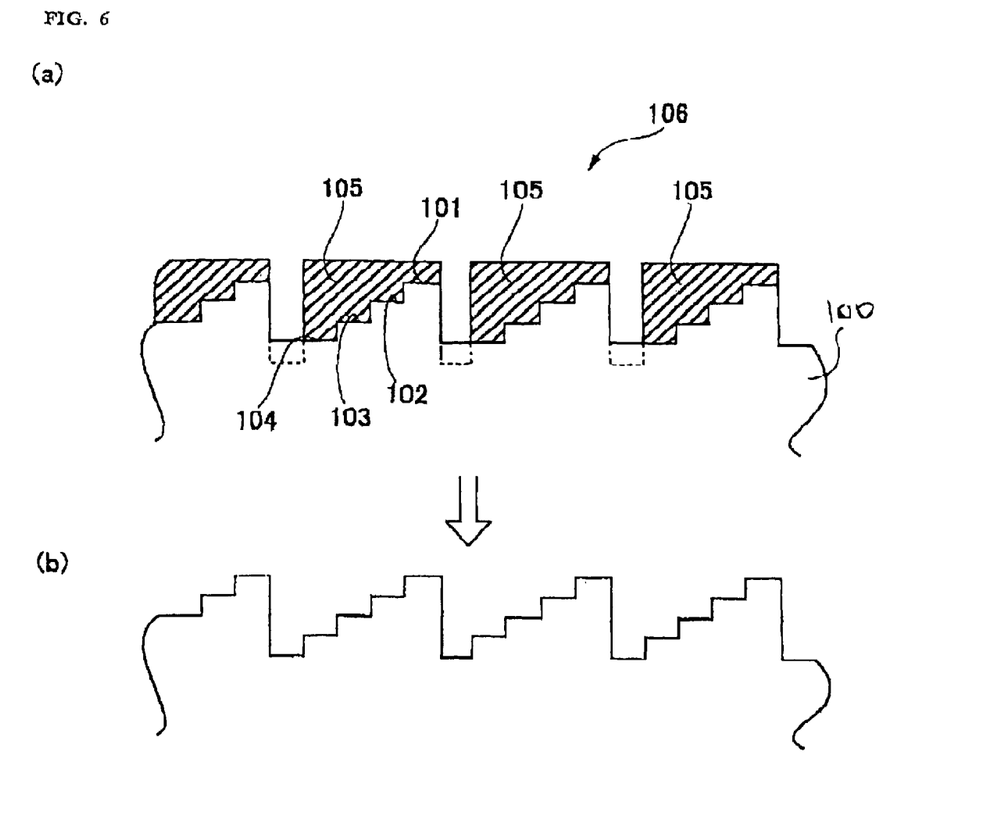
FIG. 6 is an explanatory view showing a mask pattern used to produce a binary blaze grating of 5 levels by etching.

For example, when a binary blaze grating face of 5 levels shown in FIG. 6(b) is produced by etching, it is necessary to form a resist film in such a manner that the resist film entirely covers each of the step faces already formed by respective etching processes. As shown in FIG. 6(a), in the final etching process, for example, a mask pattern 106 provided with a resist film 105 is formed on the surface of the glass substrate 100 so as to cover step faces 101, 102 and 108 having already formed and a half area of the lowest face 104. Then dry etching such as ion milling is performed from the upper side and the exposed portion on the surface of the glass substrate is etched to a depth shown by the dotted line.

Furthermore, in the case of producing step differences by etching, the working time is increased but the accuracy is lowered when the one step height of the step differences is larger than 1 μm, which results in a deterioration of the stability of the optical characteristics. Accordingly, the height of the step difference in a conventional binary blaze grating is generally set to be less than 1 μm.

The wavelength of tho laser beam for a DVD in a two-wavelength type optical pickup device is 650 nm and the wavelength of the laser beam for a CD is 780 nm. In this case, when a binary blaze grating is produced so as to transmit one of the two laser beams through without diffracting and to diffract the other, the number of levels of the step difference may be required to be other than the $2^a$ levels. Moreover, the height of the step difference of the grating may be larger than 1 μm.

However, when the binary blaze grating having the height of a step difference of 1 μm or more is produced so as to be formed with the number of levels other than $2^a$ by etching as described above, the cost is increased due to an increase in working time, and the accuracy and stability of the optical characteristics are lowered. Accordingly, an optical element provided with a binary blaze grating having stable optical characteristics with low cost, which is suitable to be used as an optical axis adjusting element for an optical pickup device, is not produced with high accuracy, inexpensively and simply.

In addition, when the binary blaze grating face having the number of levels other than $2^a$ levels, that is, 2 to the power of "a", is produced by etching, the number of times of etching is increased as described above and a forming process of the resist film becomes complicated. Therefore, the required man-hour increases, and the accuracy and the quality stability are lowered. Consequently, the conventional binary blaze grating is practically limited to the number of $2^a$ levels and the height of the step difference is limited to less than 1 μm, and thus an optical element provided with a binary blaze grating having the number of levels other than $2^a$ cannot be produced at a low cost.

These problems occur in the case when a binary blaze grating is produced on a mold for forming a binary blaze grating, on the surface of which a binary blaze grating is produced by applying a process such as dr etching.

An optical element for diffraction used as an optical axis adjusting element or a 3-beam generating diffraction grating is designed so as to obtain the optimal diffraction efficiency with respect to the wavelength of the laser beam used. Thereby, the loss of light quantity is reduced and the utilization efficiency of the light is improved. When the diffraction grating is not designed properly, reproduction performance of an optical pickup device is decreased.

In the case of using an optical axis adjusting element in an optical pickup device provided with a twin laser light source, a variation of the diffraction efficiency affects the quantity of a reproduced signal as it is and reproducing performance is lowered.

In view of the problems described above, it is an advantage of the present invention to provide an optical element with a binary blaze grating having the number of levels other than $2^a$, that is, 2 to the power of "a", which can be accurately and inexpensively formed during a short period of time. Also, it is an advantage of the present invention to produce an inexpensive optical element accurately during a short period of time.

Also, it is an advantage of the present invention to provide a mold for molding a binary blaze grating having the number of levels other than $2^a$, which can be accurately manufactured during a short period of time.

Also, it is an advantage of the present invention to provide an optical pickup device using an optical element with a binary blaze grating having the number of levels other than $2^a$, which can be accurately and inexpensively formed.

Also, it is an advantage of the present invention to provide an optical element for diffraction which is capable of obtaining the required diffraction efficiency.

Also, it is an advantage of the present invention to provide an optical pickup device using an optical element for diffraction as an optical axis adjusting element, which is capable of obtaining the required diffraction efficiency.

SUMMARY OF THE INVENTION

In order to achieve the above advantage, according to the present invention, there is provided an optical element on the surface of which a binary blaze grating is formed and the binary blaze grating is formed by a mechanical processing such as cutting work. The number of levels of the binary blaze grating is equal to or more than 5, which is other than $2^a$, and the height of the step differences of the binary blaze grating is 1 μm or more.

According to the present invention, the binary blaze grating of the optical element is produced so as to have the number of levels other than $2^a$ by means of a mechanical processing. Therefore, the required working time is reduced without lowering the working accuracy in comparison with the case produced by etching and repetitive working accuracy is also high, and thus the optical characteristics of the binary blaze grating are stable. Furthermore, the working time is not largely increased by the mechanical processing even though the binary blaze grating is provided with a large number of step differences. Also, since the working accuracy is stable, the binary blaze grating with high quality stability can be produced with preferable yield at a low cost.

The working tolerance of the mechanical processing is several tens of nm using a work machine with high accuracy and this docs not depend upon the height of the step differences. Therefore, when the height of the step difference is 1 μm or less, the ratio of the variation due to the accuracy becomes relatively larger and thus the etching processing is more advantageous than the mechanical processing as the height of the step difference becomes lower. On the contrary, when the height of the step difference becomes larger than 1 μm, the ratio of the variation by the mechanical processing becomes relatively smaller and the mechanical processing becomes extremely advantageous. Accordingly, a binary blaze grating with stable working accuracy can be produced.

In accordance with an embodiment of the present invention, the number of levels of the binary blaze grating is 5 or more and other than $2^a$, and thus mechanical processing is superior in comparison with a conventional binary blaze grating that is produced by the repeated etching process.

The number of levels of the binary blaze grating may be set to be "5x" levels or "6x" levels wherein "x" is a positive integer. For example, the number of levels is 5 or 6 levels (x=1), or 10 or 12 levels (x=2). Even in the ease of such a large number of levels, the mechanical processing is advantageous with a shorter working time and higher working accuracy than with the etching process.

In accordance with an embodiment of the present invention, the optical element is used as a diffraction grating provided with a binary blaze grating for diffracting only one of the light beams with wavelength λ1 and wavelength λ2. The optical element is provided with the binary blaze grating formed by a mechanical processing. The height of the step difference is 1 μm or more. When the light beam with the wavelength λ1 is diffracted, the height of tho step difference is set to be $(λ2+α)/(n-1)$; wherein α=0 to 10 nm and "n" is the refractive index of the diffraction grating. The number of levels is set to be "5x", wherein "x" is a positive integer. When the light beam with the wavelength λ2 is diffracted, the height of the step difference is set to be $(λ1+α)/(n-1)$; wherein α=0 to 10 nm, and the number of levels is set to be "6x".

The diffraction grating described above is particularly applicable as an optical axis adjusting element in an optical pickup device, which includes a light source for a DVD for generating a light beam with the wavelength of λ1, a light source for a CD for generating a light beam with the wavelength of λ2, a photo detector for receiving return lights that are emitted from these light sources and reflected by an optical recording medium, and the optical axis adjusting element for adjusting the optical axis of one of the return lights in order that both of the return lights are received by the photo detector.

In general, since the wavelength λ1 of the light source for the DVD is 650 nm and the wavelength λ2 of the light source for the CD is 780 nm, the wavelength λ2 for the CD is 1.2 times of the wavelength λ1 for the DVD. Therefore, the height of the step differences of the binary blaze grating corresponding to 5-wavelengths of the light for the CD corresponds to that of 6-wavelengths of the light for the DVD. Accordingly, when one blaze height of the binary blaze grating for the light beam for the CD is set to be the height of 5-wavelengths for the CD or the height corresponding to the integral multiple of 5-wavelengths, and moreover, when the binary blaze grating is formed with 6 levels (that is, the number of the step differences is five) or with the levels of the integral multiple of 6 levels, the height dimension for each step difference of the binary blaze grating is equivalent to the dimension of one wavelength of the light beam for the DVD.

As a result, when the light beam for the DVD is incident to the optical axis adjusting element formed with the binary blaze grating, the light beam for the DVD is transmitted without diffraction since the light beam for the DVD does not generate a phase difference due to the step differences. In other words, a zero-order diffraction light is generated with maximum efficiency. On the other hand, when the light beam for the CD is incident to the element, a first-order diffraction light is generated with maximum efficiency.

A laser diode with a wavelength of 650 nm used as a light source for a DVD is generally interior in durability to a laser diode with a wavelength of 780 nm and thus a drive power is restrained low and the output quantity of the laser is liable to be insufficient.

However, in accordance with an embodiment of the present invention, the optical axis of the light source for a DVD is aligned with the system optical axis of an optical pickup device and the light beam for the DVD is directly passed through the optical axis adjusting element. Accordingly, the loss of emitted light from the light source for the DVD can be suppressed to a minimum extent. Also, the light beam for a CD can be diffracted to be guided to a photo detector under a condition with high utilization light efficiency.

When the blaze height of the binary blaze grating for the light beam for the DVD is set to be the height of 6-wavelengths for the DVD or the height corresponding to the integral multiple of 6-wavelengths, and moreover, when the binary blaze grating is formed with 5 levels or with the levels of the integral multiple of 5 levels, the height dimension for one step of the binary blaze grating is equivalent to the dimension of one wavelength of the light beam for the CD. In this case, when the light beam for the CD is incident to the optical axis adjusting element formed with the binary blaze grating, the light beam for the CD is substantially transmitted through the element without diffraction since the light beam for the CD does not generate a phase difference due to the step differences. In other word a zero-order diffraction light is generated with maximum efficiency. On the other hand, when the light beam for the DVD is incident to the element, a first-order diffraction light is generated with maximum efficiency.

In order to achieve the above advantage, according to the present invention, there is provided a mold for molding an optical element having a binary blaze grating on its surface. The mold for molding includes a grating form face for forming the binary blaze grating, which is formed by mechanical processing. The number of levels of the binary blaze grating is equal to or more than 5, which is other than $2^a$, and the height of step difference is 1 μm or more.

The number of levels of the grating forming face may be set to be "5x" levels or "6x" levels, where "x" is a positive integer. For example, the number of levels is 5 or 6 levels or 10 or 12 levels.

In accordance with an embodiment of the present invention, the grating forming face is formed by a cutting work.

In order to achieve the above advantage, according to the present invention, there is provided a mold for molding a diffraction grating provided with a binary blaze grating for diffracting only one of the light beams with a wavelength of $\lambda 1$ and a wavelength of $\lambda 2$. The mold for molding includes a grating form face for forming the binary blaze grating, which is formed by mechanical processing. The height of the step difference is 1 μm or more. When the light beam with the wavelength of $\lambda 1$ is diffracted, the height of the step difference is set to be $(\lambda 2+\alpha)/(n-1)$; wherein $\alpha=0$ to 10 nm and "n" is a refractive index of the diffraction grating. The number of levels of the diffraction grating is set to be "5x", where "x" is a positive integer. When the light beam with the wavelength of $\lambda 2$ is diffracted, the height of the step difference is set to be $(\lambda 1+\alpha)/(n-1)$; wherein $\alpha=0$ to 10 nm, and the number of levels of the diffraction grating is set to be "6x".

The number of levels of the grating forming face may be set to be 5 or 6 levels or 10 or 12 levels and the grating form face may be formed by a cutting work.

In order to achieve the above advantage, according to the present invention, there is provided an optical element capable of using as an optical axis adjusting element in an optical pickup device. The optical element is formed by using the mold for molding described above. In the optical element as a molded product formed by using the mold for molding according to the present invention, the binary blaze grating of which the number of levels is other than $2^a$ and the height of the step difference is 1 μm or more is formed accurately. Therefore, the optical characteristics may not have dispersion and the performance is stable.

In order to achieve the above advantage, according to the present invention, there is provided an optical element for diffracting a laser beam with a specified wavelength. The optical element is designed to obtain optimum diffraction efficiency with respect to the laser beam with the wavelength having 2 nm to 8 nm longer than that of the laser beam emitted from a laser light source at an ordinary temperature.

An optical element for diffraction is generally designed so as to obtain optimal diffraction efficiency with respect to the emission wavelength of a laser light source at an ordinary temperature. However, according to the insight of this inventor, the temperature of a laser light source, for example, a laser diode, is higher by 10 to 30° C. than an ordinary temperature (room temperature of 25° C.) in an operating condition of an optical pickup device. Consequently, the emission wavelength of the laser light source is shifted on a longer wavelength side than the designed wavelength, and thus desired diffraction efficiency can not be often obtained. Particularly, when a diffraction grating is used as an optical axis adjusting element in an optical pickup device provided with a twin laser light source, a variation of diffraction efficiency causes to affect a reproduction signal and to lower the reproduction performance.

In accordance with an embodiment of the present invention, the optical element is designed to obtain optimal diffraction efficiency with respect to the laser beam having a wavelength 2 nm to 8 nm longer than the emission wavelength at an ordinary temperature by considering the variation of the emission wavelength of the laser light source in an actually used temperature condition in advance. Accordingly, the optical element for diffraction according to the present embodiment enables the laser beam to be diffracted with desired diffraction efficiency.

When a laser light source is determined, the emission wavelength also shifts on a longer wavelength side. However, according to the embodiment of the present invention, the optical element for diffraction is designed so as to obtain optimal diffraction efficiency on a longer wavelength side than the emission wavelength at an ordinary temperature. Therefore, even when the emission wavelength of a laser light source shifts on a longer wavelength side by deterioration, the affect of the deterioration of diffraction efficiency due to the deterioration of a laser light source can be suppressed in comparison with a conventional optical element for diffraction.

The laser beams whose wave lengths are different are used in an optical pickup device for reproducing from or recording to a CD, DVD or the like. An embodiment of an optical element for diffraction suitable for such an optical pickup device is designed so as to obtain optimal diffraction efficiency in such a manner that the diffraction efficiency of a zero-order laser beam of one of a first and second laser beams having different wavelengths and the diffraction efficiency of a first-order laser beam of the other, respectively, become to be maximum.

For example, an optical element for diffraction can be used with the laser beams in which the wavelength of the first laser beam is 650 nm and the wavelength of the second laser beam is 780 nm.

Also, the optical element for diffraction provided with a binary blaze grating as a grating face can be used.

In this case, when the height of the step difference of the binary blaze grating is set to be $(\lambda 1+\alpha)/(n-1)$; where $\lambda 1$ is the wavelength of the above-mentioned first laser beam, "n" is the refractive index of the optical element for diffraction and "$\alpha$" is a value of 2 to 8 nm, the diffraction efficiency of the zero-order light of the first laser beam, in other words, the transmitting component of the light without being diffracted can be maximum.

On the contrary, when the height of the step difference of the binary blaze grating is set to be $(\lambda 2+\alpha)/(n-1)$; where $\lambda 2$ is the wavelength of the above-mentioned second laser beam, "n" is the refractive index of the optical element for diffraction and "$\alpha$" is a value of 2 to 8 nm, the diffraction efficiency of the zero-order light of the second laser beam can be at a maximum.

In order to achieve the above advantage, according to the present invention, there is provided a optical element for diffraction provided with the binary blaze grating having the height of the step difference predetermined as described above as an optical axis adjusting element in an optical pickup device, which includes a laser light source for the DVD for generating a laser beam with a wavelength of $\lambda 1$, a laser light source for the CD for generating a laser beam with a wavelength of $\lambda 2$, a photo detector for receiving return lights that are omitted from these laser light sources and reflected by an optical recording medium, and the optical axis adjusting element for adjusting the optical axis of one of the return lights in order that both of the return lights are received by the photo detector.

According to an embodiment of the present invention, the diffraction efficiencies of respective laser beams with different wavelengths can be optimized in actually used condition. Consequently, a reduction of the reproduction signal is restrained and the deterioration of the reproduction performance is avoided. In addition, even when a laser light source is deteriorated and the emission wavelength shifts to a longer wavelength, the affect of the deterioration of diffraction efficiency due to the deterioration of the laser light source can be suppressed since the optical element for diffraction is designed so as to obtain optimal diffraction efficiency on the longer wavelength than the emission wavelength at an ordinary temperature in comparison with a conventional optical element for diffraction.

Other features and advantages of the invention will be apparent from the following detailed description, taken in conjunction with the accompanying drawings that illustrate by way of example, various features of embodiments of the invention.

DETAILED DESCRIPTION OF THE PREFERRED EMBODIMENTS

An example of a two-wavelength light source type optical pickup device provided with an optical element according to the present invention will be described in detail below with reference to the accompanying drawings.

(Optical System of an Optical Pickup Device)

Figure 1:
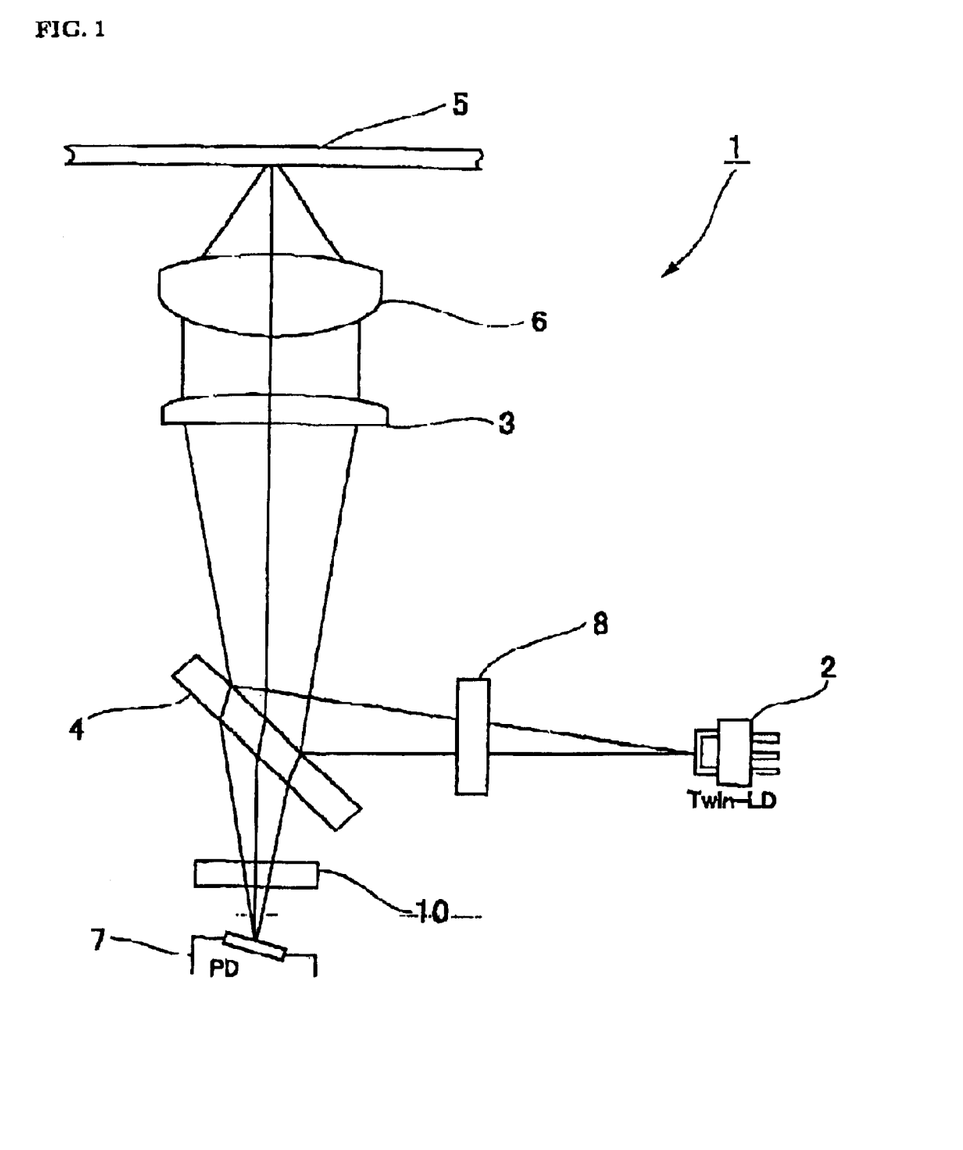
FIG. 1 is a schematic view showing an optical system of a two-wavelength light source type optical pickup device according to the present invention.

FIG. 1 is a schematic view showing an optical system of an optical pickup device according to the present embodiment. The optical system of the optical pickup device 1 according to the present embodiment is provided with a two-wavelength light source (twin-laser diode) 2, a half mirror 4 reflecting the laser beam emitted from the light source 2 to guide to a collimator lens 9, and a 2-focal point objective lens 6 for converging the laser beam formed parallel through the collimator lens 3 into a light recording medium 5. Also, the optical system is provided with a photo detector 7 for receiving the return light of the laser beam reflected from the light recording medium 5 through the objective lens 6, the collimator lens 3 and the half mirror 4. A diffraction grating 8 is disposed between the two-wavelength light source 2 and the half mirror 4. The laser beam from the two-wavelength light source 2 is diffracted into 3 beams to be directed to the light recording medium 6, and the photo detector 7 detects an error signal based on the detecting amount of the return light of the respective beams reflected from the light recording medium 5.

The optical pickup device 1 according to the present embodiment performs recording and/or reproducing of a DVD and a CD as a light recording medium 5. The two-wavelength light source 2 is constituted, for example, in such a manner that a laser diode for DVD emitting a laser beam with a wavelength of 650 nm and a laser diode for CD emitting a laser beam with a wavelength of 780 nm are arranged on a common semiconductor substrate in a package. The optical axis of the lager beam for DVDs omitted from the laser diode for the DVD is coincided with the system optical axis (optical axis of the objective lens) and the optical axis of the laser beam for the CD is slightly shifted from the system optical axis.

An optical axis adjusting element 10 provided with a binary blaze grating is arranged between the half mirror 4 and the photo detector 7 so that the shift of the optical axis may be adjusted to receive the return lights of the respective laser beams with the common photo detector 7. In the optical axis adjusting element 10 according to the present embodiment, the binary blaze grating is formed so as to generate the zero-order diffraction light with maximum efficiency (in other words, the component of the light going directly without diffracting is at a maximum) for the laser beam with the wavelength of 650 nm and to generate a first-order diffraction light with maximum efficiency for the laser beam with the wavelength of 780 nm. By appropriately setting a diffracting direction of the first-order diffraction light, the shift of the optical axis of the laser beam for CD can be adjusted so as to guide the return light of the laser beam to the detecting surface of the photo detector 7.

(Optical Axis Adjusting Element)

Figure 2:
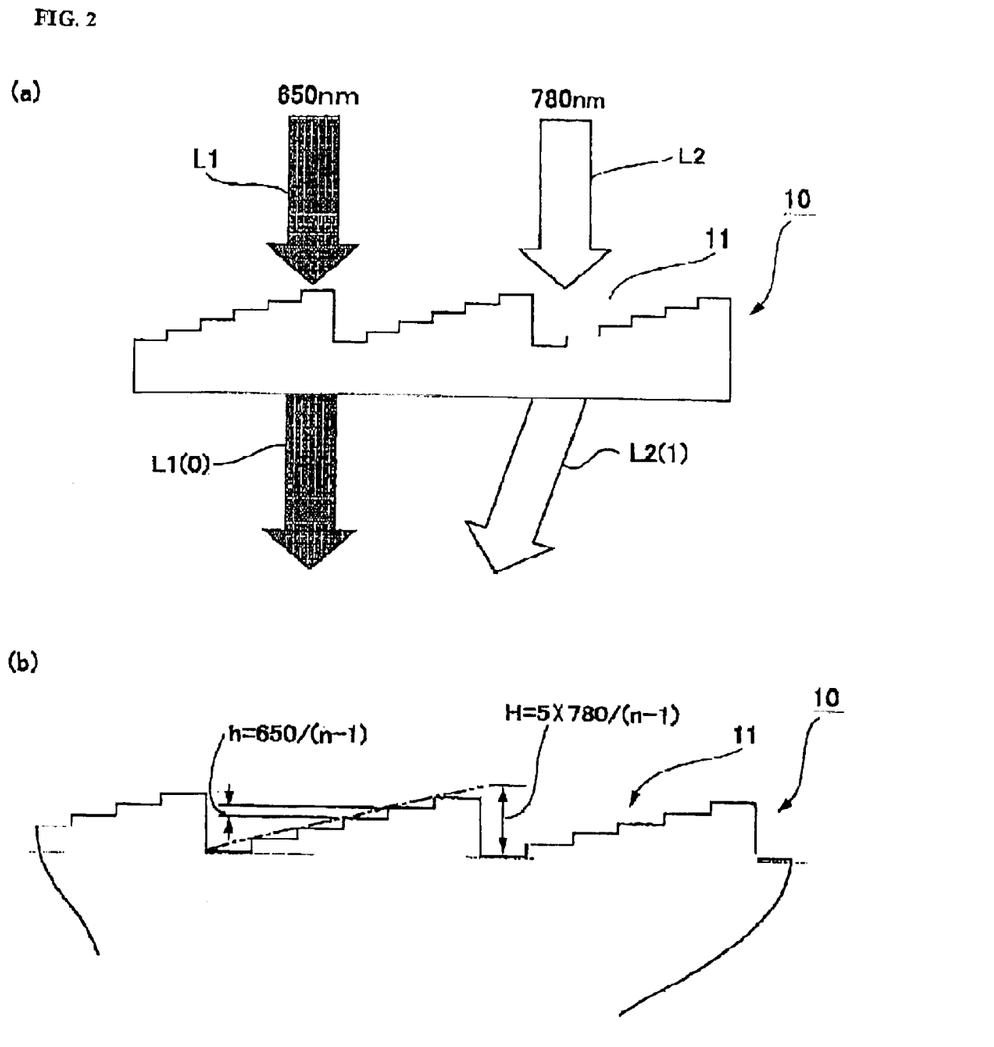
FIG. 2(a) is a cross sectional view showing an optical axis adjusting element in FIG. 1
FIG. 2(b) is a cross sectional view showing the height of a step difference and the blaze height of a binary blaze grating of the optical adjusting element in FIG. 2(a).

FIG. 2(*a*) shows a cross-sectional view of an optical axis adjusting element 10 according to the present embodiment. Referring to the drawing, a binary blaze grating 11 is formed on a light incident surface of the optical axis adjusting element 10 and a flat plane perpendicular to the optical axis is formed on the light emitting face. The binary blaze grating 11 is periodically arranged with a step-shaped grating having the same number of steps which are respectively formed in a slanted manner in the same direction on the light incident surface. According to the present embodiment, the number of step-shaped gratings each of which is composed of 6 levels (five steps) is periodically formed (only 3 cycles are shown in the drawing for easy understanding). Also, the height "h" of the step difference is set to be $650/(n-1)$(nm) and 1 $\mu$m or more, where "n" is the refractive index of the element.

The diffraction action of the optical axis adjusting element 10 according to the present embodiment will be described below. The wavelength $\lambda 1$ of the laser beam for the DVD is 650 nm and the wavelength $\lambda 2$ of the laser beam for the CD is 780 nm. Thus, the wavelength of the laser beam for the CD is 1.2 times of the wavelength of the laser beam for the DVD. Therefore, as shown in FIG. 2(*b*), the blaze height "H" $(=5\lambda 2/(n-1)=5\times 780/(n-1))$ of the binary blaze grating 11 corresponding to 5-wavelength of the laser beam for the CD is equivalent to 6-wavelengths of the laser beam for the DVD.

Accordingly, when the blaze height "H" of one cycle of the binary blaze grating 11 is set to be the dimension corresponding to 5-wavelength or the integral multiple of the 5-wavelengths of the laser beam for the CD, and further when each blaze height H of the binary blaze grating is formed so as to be composed of 6 levels (the number of the step difference is five) or of the integral multiple of 6 levels, the height "h" of one step difference of the binary blaze grating 11 is equivalent to the dimension for one wavelength of the laser beam for the DVD.

In the present embodiment, as described above, the height "h" of one step difference is set to be $650/(n-1)$ and the blaze height "H" of one cycle of the binary blaze grating 11 is set to be $5\times 780/(n-1)$. Therefore, as shown in FIG. 2(*a*), when the return light of the laser beam L1 for the DVD is incident on the optical axis adjusting element 10 provided with the binary blaze grating 11, the laser beam L1 for the DVD is transmitted straight through without being substantially diffracted since the phase difference due to the step difference is not generated. In other words, a zero-order diffraction light L1(0) is generated with maximum efficiency. On the other hand, when the laser beam L2 for the CD is incident on the optical axis adjusting element 10, a first-order diffraction light L2(1) is generated with maximum efficiency.

According to the present embodiment, since the diffracting direction of the first-order diffraction light L2(1) is properly set, the optical axis of the laser beam for the CD emitted from the two-wavelength laser light source 2 is aligned with the system optical axis. Also, the optical axis adjusting element 10 is set in such a manner that the zero-order diffraction light L1(0) of the laser beam for the DVD and the first-order diffraction light L2(1) of the laser beam for the CD are generated with maximum efficiency. Thus, utilization efficiency of laser beams with the respective wavelengths can be enhanced.

The optical axis adjusting element 10 according to the present embodiment may be formed of a molded product made of plastic or the like, which is formed by means of a mold for molding. Also, the element 10 can be formed of an optical material such as glass or plastic by applying a mechanical processing directly on the surface of the material.

When the optical axis adjusting element 10 is produced by molding, a grating form face for forming the binary blaze grating in a mold for molding is worked by a mechanical processing. A cutting work is desirable as a mechanical processing because of small surface roughness. The grating form face is formed to have a face of step differences having the number of levels corresponding to the binary blaze grating 11 of the optical axis adjusting element 10 described above.

Similarly, when the binary blaze grating is formed on the surface of an optical material by applying the mechanical processing, the cutting work is preferable to reduce the degree of surface roughness.

In the optical axis adjusting element 10 according to the present embodiment, the height "h" of one step difference is set to be the dimension larger than 1 $\mu$m. The step difference is formed on a grating form face in a mold by means of a mechanical processing such as cutting work or on a surface of optical material by means of the mechanical processing such as cutting work. Therefore, unlike the step difference formed by the etching process, the grating form face for forming the binary blaze grating or the binary blaze grating can be formed with a shorter working time and high accuracy. Accordingly, the optical axis adjusting element 10 provided with the binary blaze grating 11 can be produced at a low cost. Also, the optical axis adjusting element 10 having the stable performance and little dispersion of optical characteristics can be obtained.

The binary blaze grating according to the present embodiment is formed to have 6 levels and similar operational-effects can be obtained even when the binary blaze grating is formed to have a number of integral multiples of 6 levels. However, it is practical to produce a binary blaze grating having 6 levels or 12 levels.

(Other Preferred Embodiments)

In the above-mentioned example, the binary blaze grating is formed with 6 levels, but it is possible that the number of levels is set to be 5 levels or 10 levels and the height of the step difference is set to be $780/(n-1)$. In this case, since the laser beam L2 for the CD does not generate the phase difference due to the step difference, the laser beam L2 is transmitted straight through without being substantially diffracted. Therefore, tho optical axis adjusting element having a maximum diffraction efficiency for a first-order light beam for the DVD and a maximum diffraction efficiency for a zero-order light beam for the CD can be produced.

Also, the present invention can be applied to an optical element different from the above-mentioned embodiment, which in provided with a binary blaze grating having the number of levels other than $2^a$. Particularly, when the constitution of the present invention is applied to the binary blaze grating having a large number of steps (a large number of levels), the binary blaze grating can be produced by a further shorter working time and a higher working accuracy.

(Optimal Design for an Optical Axis Adjusting Element)

When an optical axis adjusting element is designed so as to have an optimal diffraction efficiency on the beam of the emission wavelength at an ordinary temperature (room temperature of 25° C.), the height "h" of one step difference is determined to be 650/(n−1) and the blaze height "H" of one cycle of the binary blaze grating is determined to be 5×780/(n−1) as described above.

However, according to the insight of the inventor, the laser light source 2 is heated to a temperature about 40 to 50° C. in an operating condition due to its self-heating operation or the like. In such a temperature condition 10 to 80° C. higher than at room temperature, the emission wavelength is shifted 2 nm to 8 nm on the longer wavelength compared with the emission wavelength at an ordinary temperature.

Figure 3:
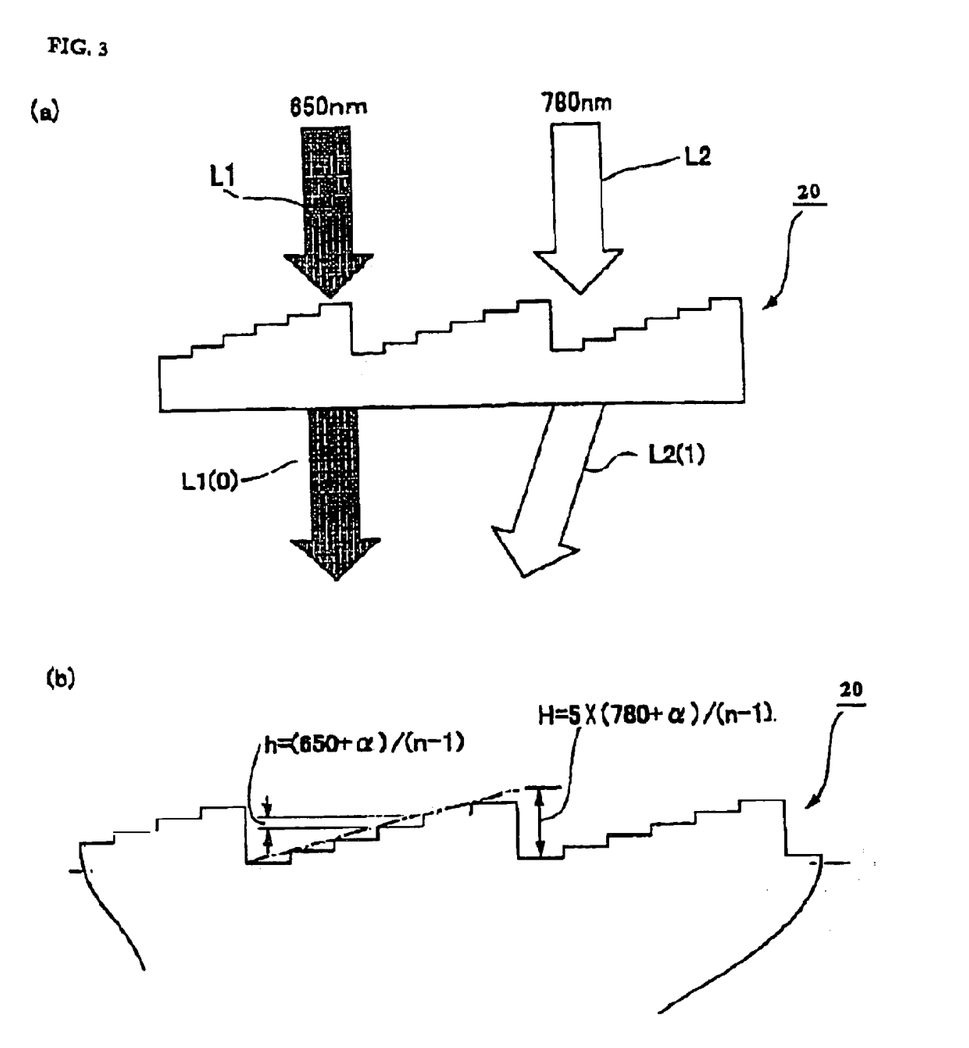
FIG. 3(a) is a cross sectional view showing another example of an optical axis adjusting element in FIG. 1
FIG. 3(b) is a cross sectional view showing the height of a step difference and the blaze height of a binary blaze grating of the optical axis adjusting element in FIG. 3(a).

Accordingly, in tho optical adjusting element 20 according to the present embodiment, the height "h" of the step difference is set as follows. That is, as shown in FIG. 3(b), the height "h" of the step difference is set to be (650+α)/(n−1), where "α" is a value between 2 nm and 8 nm. Therefore, the blaze height "H" is determined to be 5×(780+α)/(n−1).

When the return light of the laser beam L1 for the DVD is incident to the optical axis adjusting element 20 constituted as described above, the zero-order diffraction light L1(0) of the laser beam L1 for the DVD is generated with a maximum efficiency because the phase difference due to the step difference does not occur. Further, the first-order diffraction light L2(1) of the laser beam L2 for the CD is generated with a maximum efficiency.

Figure 4:
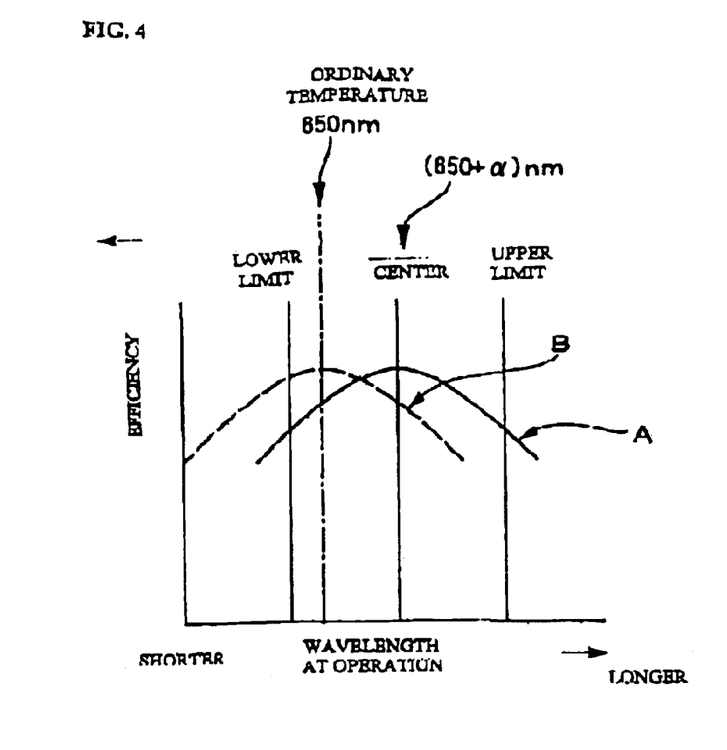
FIG. 4 is a graph showing an operation-effect of the optical axis adjusting element in FIG. 3.

FIG. 4 is a graph showing operation-effect of the optical axis adjusting element 20 according to the present embodiment. As shown in this drawing, the optical axis adjusting element 20 according to the present embodiment is formed in such a manner that the maximum diffraction efficiency is obtained with respect to the wavelength (650+α), which is the wavelength under the operating condition, as the center wavelength as shown in the performance curve "A" by the solid line. The operating temperature of the laser light source 2 corresponding to the center wavelength (650+α) is 10 to 30° C. higher than at an ordinary temperature (25° C.).

On the other hand, in the case of the diffraction grating which is optimally designed based on the ordinary temperature, as shown in a performance curve B by the broken line, the optical axis adjusting element is formed in such a manner that the maximum efficiency is obtained with respect to the emission wavelength of 650 nm at an ordinary temperature (25° C.) as the center wavelength. Accordingly, since the emission wavelength of the laser light source is shifted to a longer wavelength under an actual operating condition, the diffraction efficiency is also shifted from the optimal state.

In addition, like the optical axis adjusting element 20 according to the present embodiment, when the diffraction efficiency is optimally designed on a longer wavelength than the emission wavelength at an ordinary temperature of the laser light source 2, it is effective for the shift on a longer wavelength of the emission wavelength due to the deterioration of the laser light source 2. According to this embodiment, the diffraction efficiency is set so as to obtain the maximum efficiency at a position on a longer wavelength than the design at an ordinary temperature. Therefore, even when the laser light source 2 is deteriorated and the emission wavelength is shifted on a longer wavelength, the reduction of diffraction efficiency is suppressed in comparison with the diffraction efficiency of the design at an ordinary temperature. In other words, according to this embodiment, the reduction of diffraction efficiency caused by deterioration of the laser light source can be prevented.

The optical axis adjusting element 20 provided with the binary blaze grating according to the present embodiment can be produced by an etching process or a mechanical cutting of the optical material. The optical axis adjusting element 20 can be also produced as a molded product. In this case, the form face of a mold for molding is manufactured by an etching process or a mechanical cutting as described above.

In the present embodiment, the laser beam with the wavelength of 650 nm is transmitted straight through and the laser beam with the wavelength of 780 nm is diffracted. However, the optical axis adjusting element may be formed in such a manner that the laser beam with the wavelength of 650 nm is diffracted and the laser beam with the wavelength of 780 nm is transmitted straight through.

Figure 5:
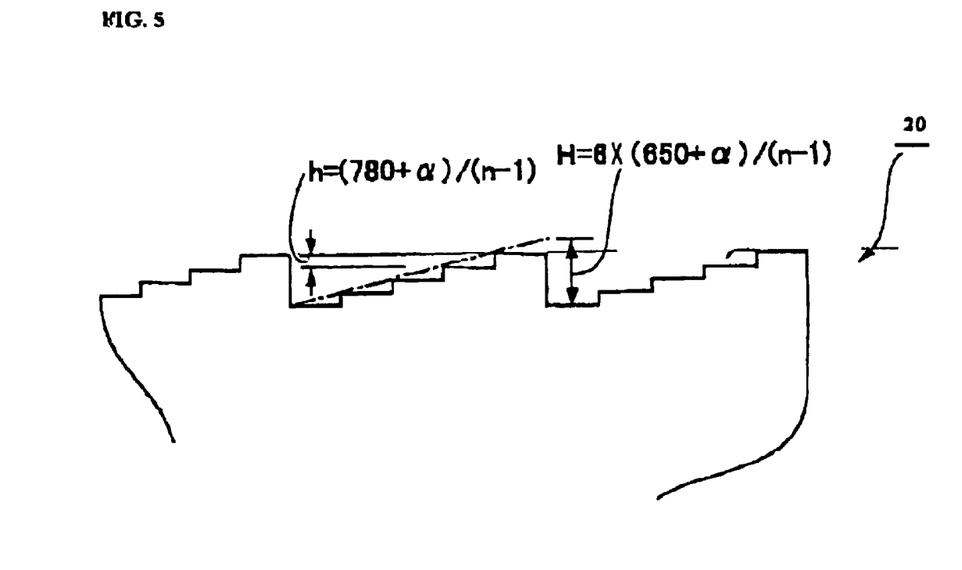
FIG. 5 is a cross sectional view showing further another example of an optical axis adjusting element in FIG. 1.

In this case, for example, as shown in FIG. 5, the height "h" of the step difference of the binary blaze grating is set to be (780+α)/(n−1), the blaze height "H" 6×(650+α)/(n−1) and the number of levels may be 5 (the number of step differences is 4) (where, α=2 nm to 8 nm).

It is preferable that "α" is set to be 2 nm to 8 nm, but it is possible to set "α" 0 to 10 nm for diffracting the light beam with the wavelength of λ1 by the height of the step difference being set to be (λ2+α)/(n−1), where "n" is the refractive index of the diffraction grating, and the number of levels is set to "5x" levels where "x" is a positive integer. When the light with the wavelength of λ2 is diffracted, it is possible to set "α" 0 to 10 nm by the height of the step difference being set (λ1+α)/(n−1) and the number of the levels is set to be "6x" level.

(Other Embodiments)

The above-mentioned example is of an optical axis adjusting element for performing an optical axis adjustment of laser beams with different wavelengths in a two-wavelength light source type optical pickup device. The present invention is similarly applicable to an optical element for diffraction provided with a binary blaze grating for the use other than with the optical axis adjusting element.

In addition, the present invention is also applicable to a diffraction grating other than a binary blaze grating. For example, in the optical pickup device in FIG. 1, an optical element for diffraction according to the present invention can be applied to the diffraction grating 8 for generating 3 beams.

As described above, in accordance with the present invention, a binary blaze grating in which the height of the step difference is 1 μm or more and the number of levels is 5 or more and other than $2^a$ is produced by means of a mechanical processing such as cutting work. Therefore, unlike the case of forming a conventional binary blaze grating by an etching process, the binary blaze grating is formed without largely increasing of the working time and the lowering of the working accuracy. Similarly, a grating form face for forming a binary blaze grating in a mold can be accurately formed in a short time. Furthermore, even though the binary blaze grating is provided with a large number of step differences, the working time and the working accuracy can be kept stable and the repetition working accuracy is also high. Consequently, the binary blaze grating and the mold for the binary blaze grating can be produced with high quality stability and a preferable yield at a low cost.

Particularly even when there are a large number of steps such as five or six levels or 10 or 12 levels, the binary blaze grating and the mold for the binary blaze grating can be produced with a shorter working time and with a high working accuracy.

When the optical element according to the present invention is used as an optical axis adjusting element in a two-wavelength light source type optical pickup device, the maximum zero-order diffraction efficiency is obtained for one of the light beams for the DVD and the CD and the maximum first-order diffraction efficiency is obtained for the other of the light beams for the DVD and the CD with a high accuracy at a low cost.

In addition, in an optical pickup device using the optical axis adjusting element, utilization efficiency of the light beams with respective wavelengths is high and, moreover, the performance of the optical axis adjusting element is stable. Accordingly, since the optical axis adjustment can be accurately and easily performed, it is advantageous for stabilization of performance and reduction of cost in an optical pickup device.

In addition, tho optical element according to the present invention is designed to obtain the optimal diffraction efficiency with respect to the laser beam with the wavelength of 2 nm to 8 nm longer than the emission wavelength emitted from the laser light source at an ordinary temperature. The laser light source is heated to a temperature about 40 to 50° C. in an operating condition, that is, the laser light source is used at an actually used temperature that is different from, higher than the room temperature or an ordinary temperature. In such a temperature condition higher than the room temperature, the emission wavelength is shifted 2 nm to 8 nm on the longer wavelength side, but it depends on the types or models of the laser light source or the like. Therefore, one has to ascertain or estimate how much the wavelength is shifted at an actually used temperature in advance and the optical element is designed so as to optimize the diffraction efficiency with respect to the estimated wavelength, which is longer 2 in to 8 nm. Therefore, the laser beam is diffracted with a desired diffraction efficiency by using the optical element for diffraction of the present invention.

Also, according to the present invention, although the emission wavelength is shifted to a longer wavelength when the laser light source is deteriorated, the affect of the reduction of diffraction efficiency due to the deterioration of the laser light source can be restrained in comparison with a conventional optical element for diffraction because the optimal design of diffraction efficiency is performed on a longer wavelength than the emission wavelength at an ordinary temperature.

In addition, in an optical pickup device according to the present invention, the diffraction efficiency of an optical axis adjusting element for adjusting the optical axis of the return light, which is emitted from the laser light source for the DVD or the laser light source for the CD and reflected from an optical recording media, is optimally designed for the emission wavelength of 2 nm to 8 nm longer than the wavelength of the laser light source at an ordinary temperature. Therefore, according to the present invention, since the diffraction efficiency of the optical axis adjusting element is optimized for the operating condition in an optical pickup device, the degradation of reproducing performance caused by lowering of reproducing signal can be prevented.

While the description above refers to particular embodiments of the present invention, it will be understood that many modifications may be made without departing from the spirit thereof. Tho accompanying claims are intended to cover such modifications as would fall within the true scope and spirit of the present invention.

The presently disclosed embodiments are therefore to be considered in all respects as illustrative and not respective, the scope of the invention being indicated by the appended claims, rather than the foregoing description, and all changes which come within the meaning and range of equivalency of the claims are therefore intended to be embraced therein.

What is claimed is:

1. A diffraction grating provided with a binary blaze grating comprising:

a height of a step difference of the binary blaze grating is greater than or equal to 1 $\mu$m and, in addition, is set to be $(\lambda 2+\alpha)/(n-1)$, where "n" is a refractive index of the diffraction grating and "$\alpha$" is between 2 and 8 nm; and a number of levels of the binary blaze grating is "5x", where "x" is a positive integer, wherein the binary blaze grating diffracts only a light beam with a wavelength of $\lambda 1$ between light beams with wavelengths of $\lambda 1$ and $\lambda 2$.

2. The diffraction grating according to claim 1, wherein the binary blaze grating is formed by a cutting process.

3. The diffraction grating according to claim 1, wherein the number of levels of the binary blaze grating is 5 or 10.

4. A mold for forming a diffraction grating provided with a binary blaze grating comprising:

a grating form face for forming the binary blaze grating, the grating form face is formed by a mechanical processing;

a height of step differences of the grating form face is greater than or equal to 1 $\mu$m and, in addition, is set to be $(\lambda 2+\alpha)/(n-1)$, where "n" is a refractive index of the diffraction grating and "$\alpha$" is between 2 and 8 nm; and a number of the step difference of the grating form face is a number corresponding to a number of levels of the binary blaze grating that is a multiple of 5.

5. The mold according to claim 4, wherein the grating form face is formed by a cutting process.

6. The mold for molding according to claim 4, wherein the number of the step differences of the grating form face is the number corresponding to 5 or 10 levels of the binary blaze grating.

7. An optical element provided with a binary blaze grating on a surface of the optical element comprising:

a grating formed face which is formed with the binary blaze grating, the grating form face is formed by a mechanical processing;

a number of step differences of the grating formed face corresponds to a number of levels of the binary blaze grating, that is greater than or equal to 5; and a height of the step difference is greater than or equal to 1 $\mu$m and is set to be $(\lambda 2+\alpha)/(n-1)$, where "n" is a refractive index of the diffraction grating "$\alpha$" is between 2 and 8 nm.

8. The optical element according to claim 7, wherein the optical element is designed to obtain optimal diffraction efficiency with respect to the laser beam with a wavelength having 2 nm to 8 nm longer than the emission wavelength of the laser light source at an ordinary temperature.

9. The mold according to claim 8, wherein the optical element is designed to obtain optimal diffraction efficiency in such a manner that diffraction efficiency of a zero-order light beam of one of a first and a second laser beams whose wavelengths are different from each other and diffraction efficiency of a first-order light beam of the other respectively become maximum.

10. The mold according to claim 9, wherein the wavelength of the first laser beam is 650 nm and the wavelength of the second laser beam is 780 nm.

11. A diffraction grating provided with a binary blaze grating comprising:
   a mold provided with a grating form face for forming the binary blaze grating, the grating form face is formed by a mechanical processing;
   a height of step differences of the grating form face is greater than or equal to 1 μm and, in addition, is set to be $(\lambda 2+\alpha)/(n-1)$, where "n" is a refractive index of the diffraction grating and "α" between 2 and 8 nm; and
   a number of step differences of the grating form face is a number corresponding to a number of levels of the binary blaze grating that is a multiple of 5.

12. An optical pickup device provided with a light source for DVD emitting a light beam with a wavelength of $\lambda 1$, a light source for CD emitting a light beam with a wavelength of $\lambda 2$, a photo detector for receiving each of return light beams which are emitted from the light sources and reflected by an optical recording media, and an optical axis adjusting element for adjusting an optical axis of one of the return light beams in such a manner that each of the return light beams is received by the photo detector,
   wherein the optical axis adjusting element is a diffraction grating provided with a binary blaze grating for diffracting only the light beam with the wavelength of $\lambda 1$ among the light beams of the wavelength $\lambda 1$ and the wavelength $\lambda 2$,
   the binary blaze grating is formed by mechanical processing,
   a height of step differences of the binary blaze grating is 1 μm or more and $(\lambda 2+\alpha)/(n-1)$; where "n" is a refractive index of the diffraction grating and "α"=2 to 8 nm; and
   the number of levels of the binary blaze grating is "5x", where "x" is a positive integer.

13. An optical pickup device; comprising:
   a laser light source for a DVD emitting a laser beam with a wavelength of $\lambda 1$;
   a laser light source for a CD emitting a laser beam with a wavelength of $\lambda 2$;
   a photo detector that receives return light beams which are emitted from the laser light sources and reflected by an optical recording media; and
   an optical axis adjusting element that adjusts an optical axis of one of the return light beams in such a manner that each of the return light beams is received by the photo detector,
   wherein the optical axis adjusting element is an optical element provided with a binary blaze grating and a height step differences of the binary blaze grating is $(\lambda 2+\alpha)/(n-1)$, where "n" is a refractive index of the optical element and "α" is between 2 to 8 nm.

* * * * *